United States Patent [19]

Halim

[11] Patent Number: 4,582,354

[45] Date of Patent: Apr. 15, 1986

[54] BUS CONSTRUCTION FOR SEAT-BED TRANSPORT AND STATION THEREFOR

[76] Inventor: Wibara Halim, Jalan Kebraon 59 Sepanjang, Surabaya 60222, Indonesia

[21] Appl. No.: 634,887

[22] Filed: Aug. 13, 1984

[51] Int. Cl.⁴ ............................................. B60N 1/00
[52] U.S. Cl. .................................... 296/64; 296/178; 105/344
[58] Field of Search ..................... 296/64, 178, 24 R; 105/340, 344, 345, 315

[56] References Cited

U.S. PATENT DOCUMENTS

| | | | |
|---|---|---|---|
| 1,744,891 | 1/1930 | Hedley | 105/344 |
| 1,769,024 | 7/1930 | Hutt | 296/64 |
| 1,798,011 | 3/1931 | Cernuda | 296/64 |
| 1,838,765 | 12/1931 | Hutt | 296/64 |
| 1,901,023 | 3/1933 | Corbin | 296/64 |
| 2,884,873 | 5/1959 | Candlin, Jr. | 105/315 |

*Primary Examiner*—Robert R. Song
*Attorney, Agent, or Firm*—William H. Maxwell

[57] ABSTRACT

A bus construction and loading station for selective seated and reclined posture of passenger transport in a multiplicity of isolated compartments one above the other between bays formed by reinforcement bulkheads, with individually controlled air conditioning into each compartment, and each compartment being divisible to separate passengers.

20 Claims, 7 Drawing Figures

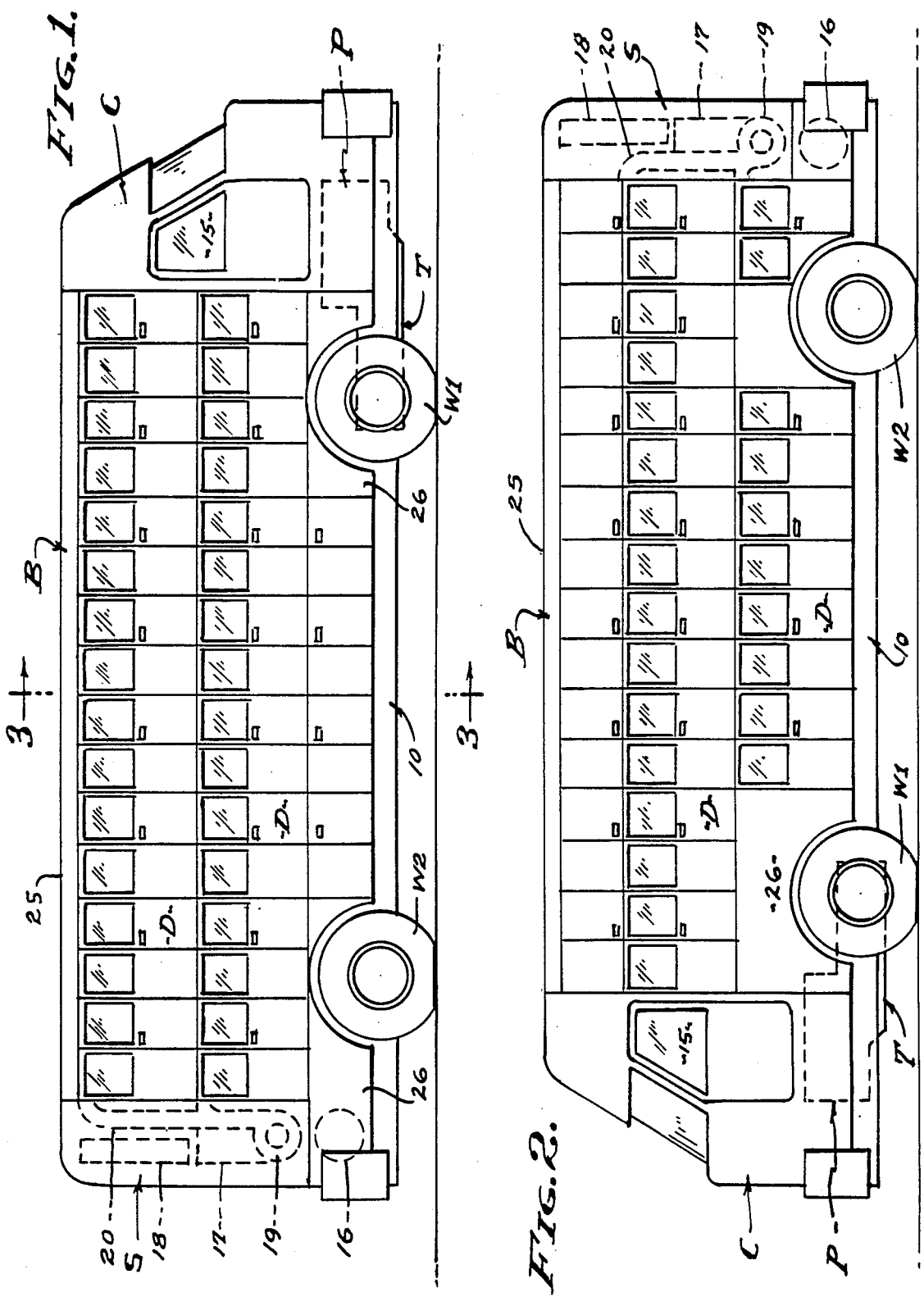

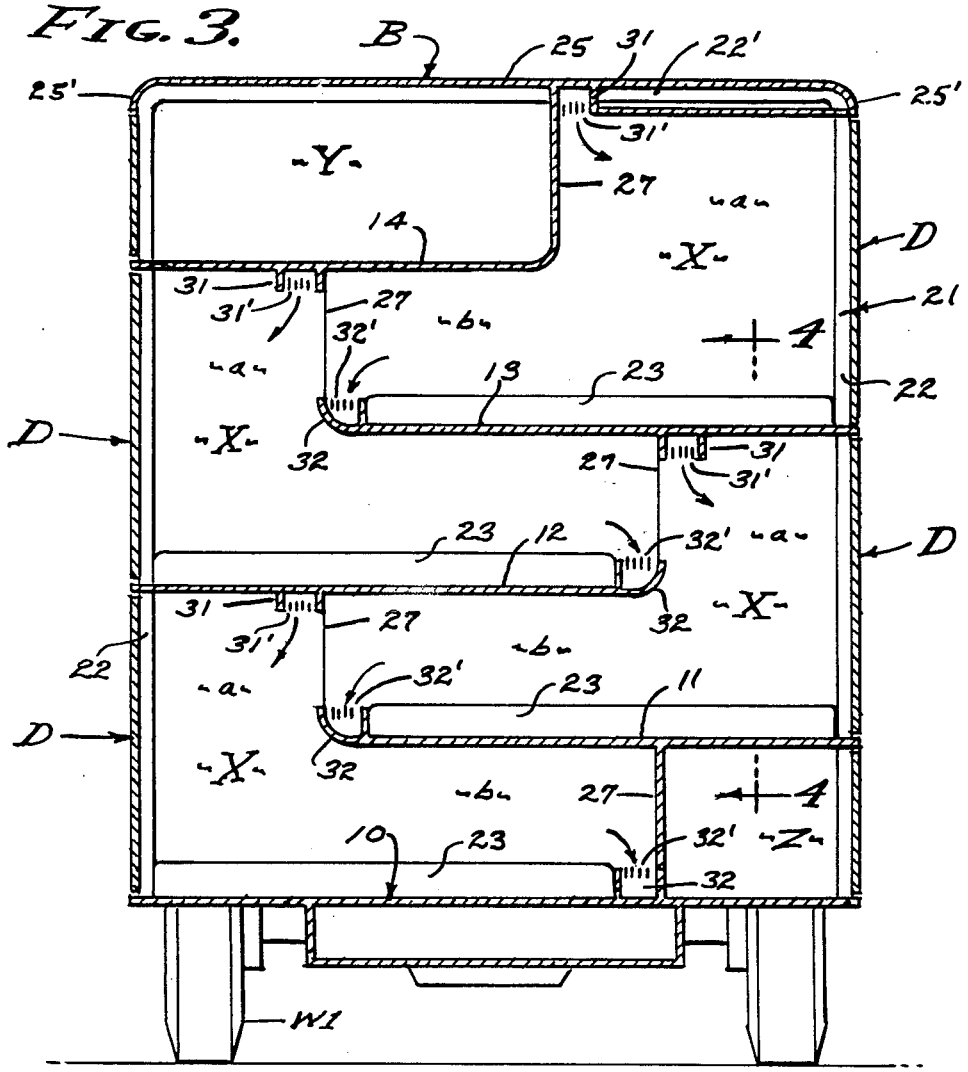
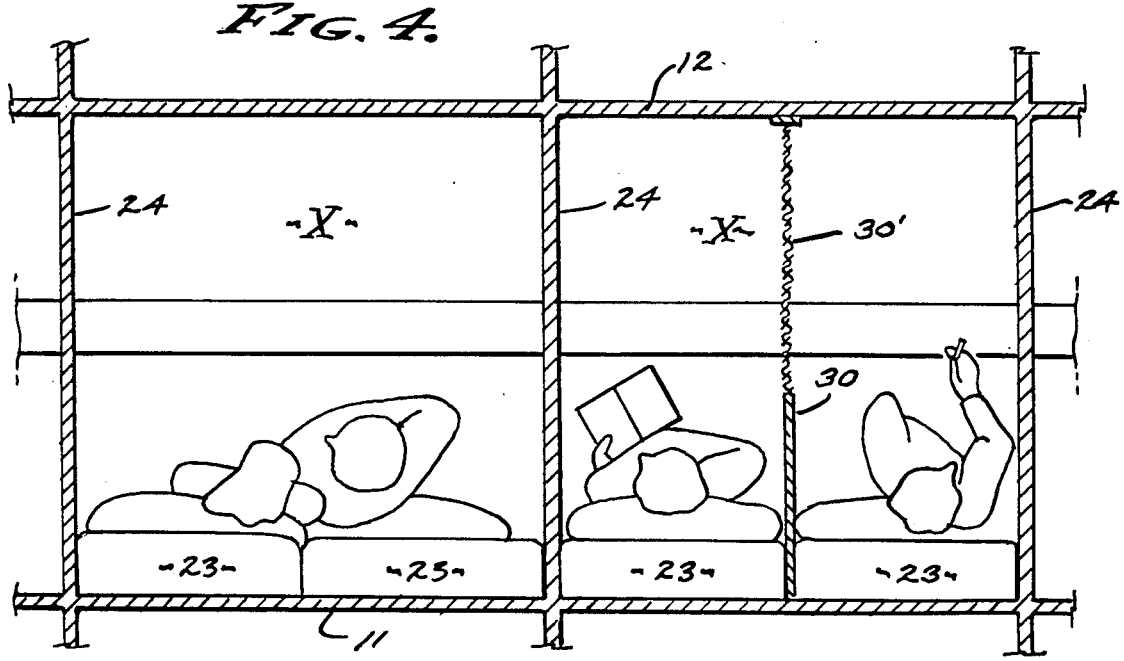

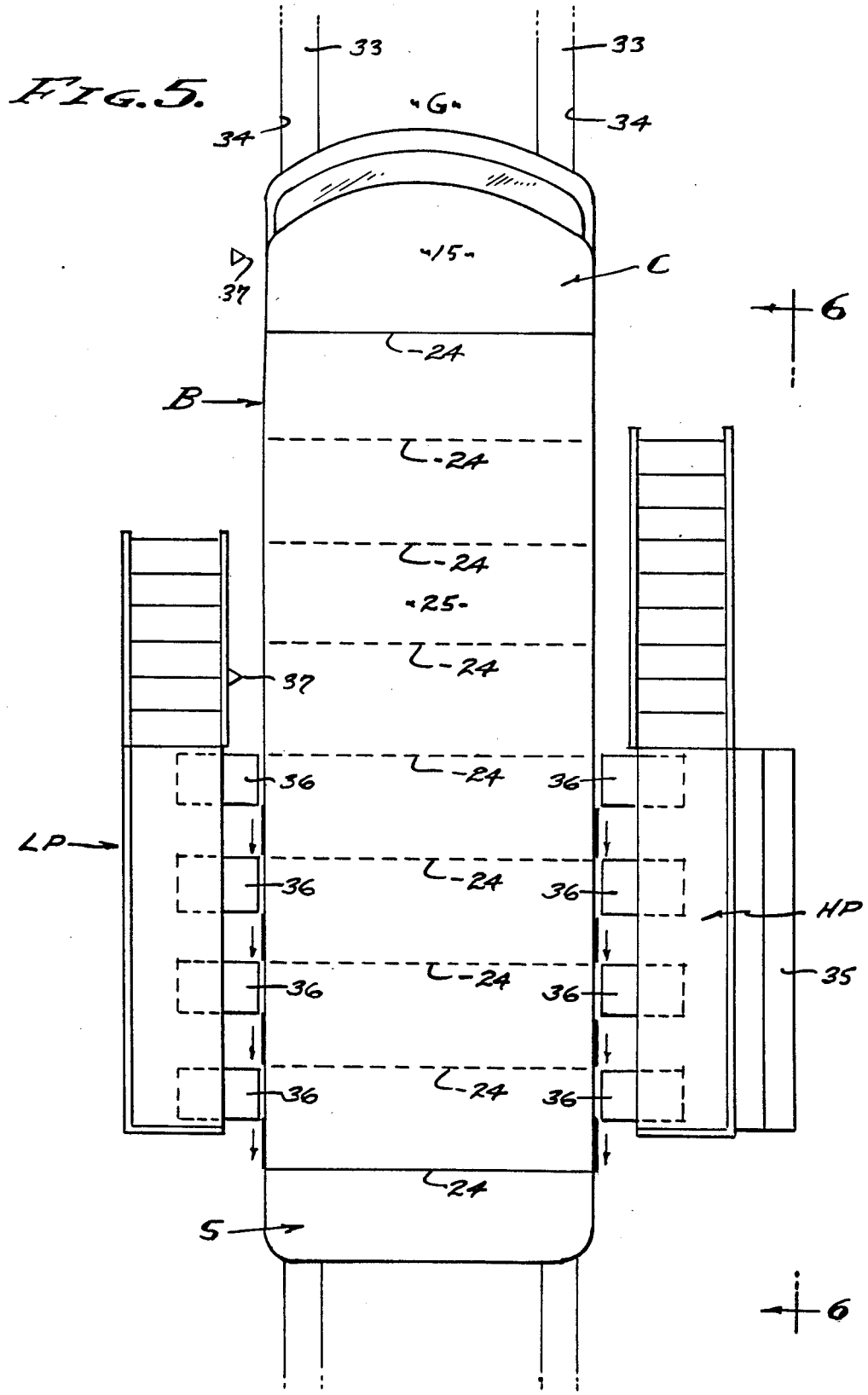

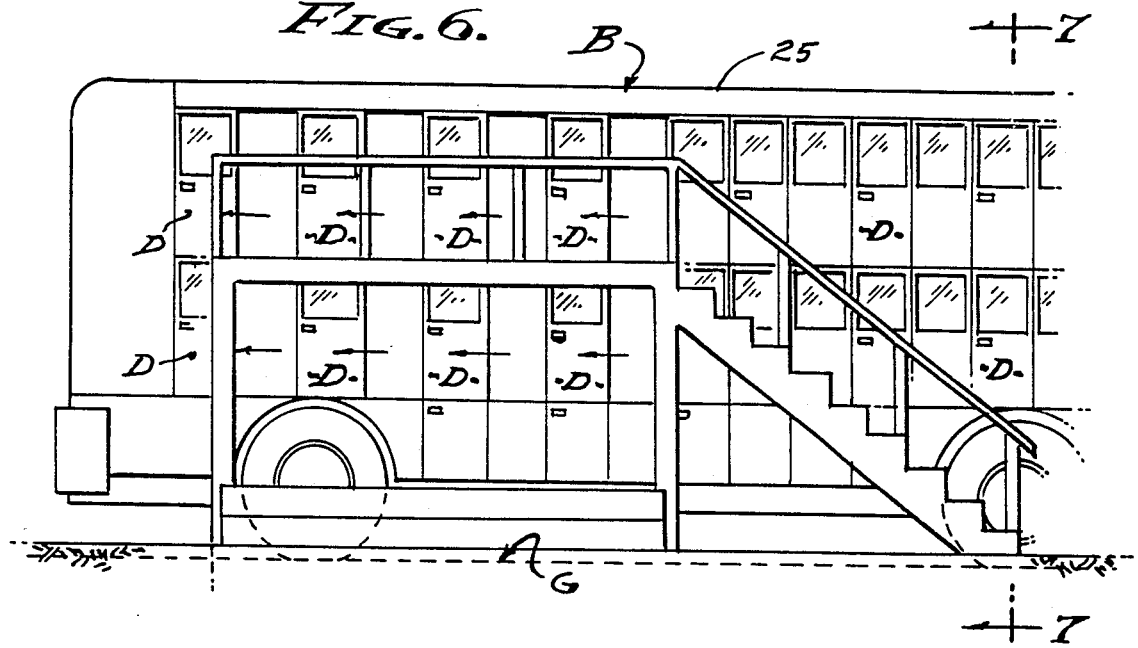
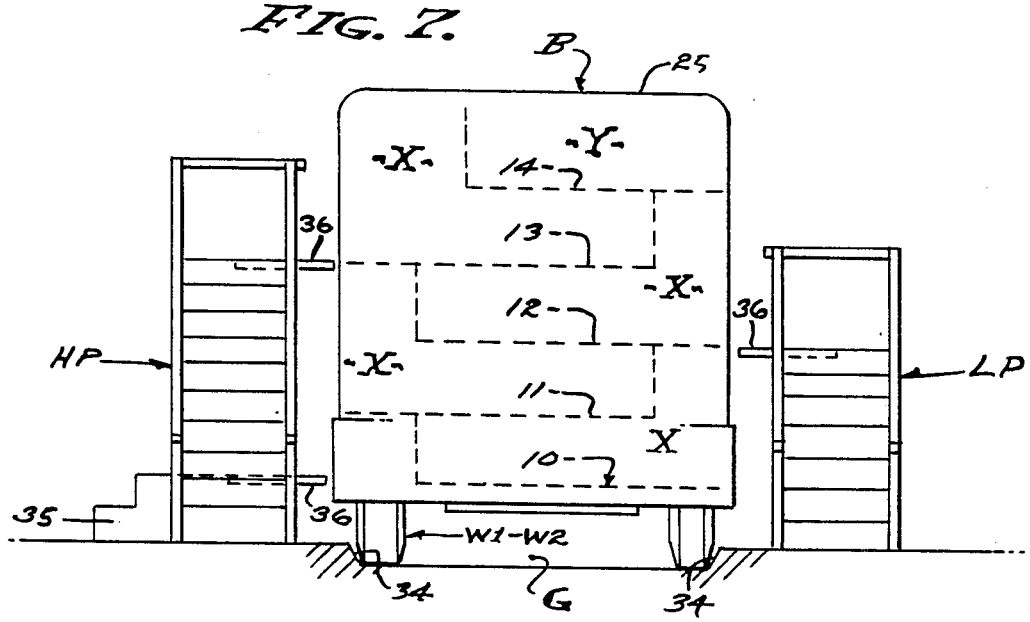

BUS CONSTRUCTION FOR SEAT-BED TRANSPORT AND STATION THEREFOR

Reference is made to Disclosure Document No. 128,740 filed in the United States Patent Office June 28, 1984.

BACKGROUND

This invention relates to a seat-bed system of human transport by bus, it being a general object hereby to increase vehicle capacity and to improve passenger comfort.

Heretofore, bus. transport has been characterized by seating comprised of upright chairs arranged closely side by side with a center aisle, and spaced apart longitudinally of the passenger compartment sufficiently for leg room and partial reclining. Although upright state of the art seating is accepted, it has its difficiencies with respect to posture of the passengers while being subjected to jolting as caused by rough roads, especially over lengthy periods of time. With respect to posture, it is known that the erect stature of man has developed with a tendency toward deficiencies or excess pressure to the spinal column, resulting in great discomfort and chronic back trouble. It is presently estimated that 70 million people in the United States are suffering from this chronic condition. However, a natural reclining posture relieves deterimental pressures and impact upon the spinal column, and accordingly it is an object of this invention to provide beds upon which passengers may sit or lie, and so that a reclining posture can be assumed under rough riding conditions, thereby to relieve the discomfort otherwise experienced when sitting erect. With the present invention, each passenger has this choice, and during lengthy journies is offered optimum resting and sleeping conditions.

Vehicle construction is inherently weak when bracing structure is absent, as it is in the case with conventional bus construction which is characterized by a single open passenger compartment. In this invention, the body of the bus is reinforced by dividing it transversely by bulkheads forming separated bays, and each bay being divided into four separate compartments. Further if desired, each compartment can be divided by a removable separator and sliding curtain in order to separate two individuals. Further, each compartment can be divided by a removable curtain, in order to separate two individuals.

It is an object of this invention to completely isolate one compartment from the other. In order to establish passenger privacy and a clear atmosphere, the bulkheads and floors and partitions are airtight, so that cross ventilation between compartments is eliminated. Therefore, smokers are isolated from non-smokers, and disagreable odors cannot be transfered from one compartment to another.

It is an object of this invention to improve passenger comfort. To this end each compartment is furnished with a coextensive floor cushion. Additionally, one or more movable cushions may be provided as a back rest or head rest, all as circumstances require.

It is an object of this invention to provide separate access to each compartment. Ingress and egress is achieved to the multiplicity of separate compartments is by means of doors individual to each compartment. The doors are of conventional vehicle type; full doors, or sliding doors, or folding doors, together establishing the sides of the bus body, as will be described.

It is an object of this invention to provide baggage compartments for stowing luggage and handbags etc., quickly accessible to the passengers. In practice, the length of the compartments is less than the breadth of the bus body, and they are alternately stepped so that a baggage compartment occurs both at the lower level and at the highest level of the bus body as shown.

It is an object of this invention to provide atmospheric comfort. To this end air conditioning means is incorporated in the bus body with ducting combined for the induction of fresh air and with ducting for exhaust of used air. Controlled inlet vents face the passengers so that inlet air can be adjusted, and each compartment has its individual air conditioning control.

It is an object of this invention to provide a conventional driver's station in a passenger transport vehicle of the character thus far described, in the form of a cab-over-engine unit in a forward position with a front drive axle. Alternately, a rear drive engine and axle unit can be employed. However, a front wheel drive is preferred to eliminate a long drive chain and to simplify the chassis and lower frame and floor structure, as shown. Further, the rear wheels and suspension are advantageously housed between bays and within lower compartment areas as shown.

It is an object of this invention to integrate and combine the aforesaid bus construction and passenger compartment configuration with a loading and unloading station therefor, embarkation and disembarkation being achieved for passengers at higher levels by means of station platforms with retractably extensible bridges that align with the compartment door openings for access. In practice, the station platforms and bridges preferably service a plurality of compartments at each side of the bus, and the lower level floors are accessible from road level with a step provided when required.

SUMMARY OF THE INVENTION

The bus body construction disclosed herein is for seat-bed transport of passengers in transit between stations enrout to a destination. The bus trips are expected to be rough when routed through rural terrains and bumpy roads, and the time interval between departure and destination is expected to be lengthy. As a result of these adverse conditions, a journey is expected to be tiresome. Passengers occupying state-of-the-art seating will most apt to be uncomfortable and will suffer from back aches because of the erect postures which are forced to be maintained. Therefore, it is an object of this invention to aleviate discomfort and back aches, while increasing the bus payload, and thereby increased bus revenues. The estimated increase will be as much as 50% over conventional bus construction, by following the teachings herein disclosed.

In addition to the provision of isolated air conditioned compartments, other amenities are provided. For example, there is a smoke alarm system to monitor compartments where non-smoking rules prevail and would be violated. The odor of smoking and the burning of tobacco will invariably permeate the compartment interiors, and especially cushioning, to the distaste of non-smoking passengers. And, there is an audio system for entertainment and intercommunication as and when required.

There is a multiplicity of double passenger compartments, like a twin bed, and each compartment is side opening for entrance and exit via a single door. The stepped compartments are disposed at increasingly higher levels, the lower levels being accessible from street level, and the higher levels being accessible by ladder or station platform as shown herein. The ladder/stair or platform facilitates ingress and egress, but in the event of an emergency a person may jump safely from the highest level without injury, the maximum height being approximately as for example little more than seven feet. Auxiliary steps and/or ladders are to be carrid by the bus for use as circumstances require. A bus constructed and operated according to the present invention converts long agonizing hours of travel into a pleasurable time period without subjecting passengers to back fatigue or injury.

The foregoing and various other objects and features of this invention will be apparent and fully understood from the following detailed description of the typical preferred form and application thereof, throughout which description reference is made to the accompanying drawings.

THE DRAWINGS

FIG. 1 is a longitudinal side elevational view of the bus construction of the present invention, showing the side thereof with passenger compartments at the second and fourth levels.

FIG. 2 is a view similar to FIG. 1, showing the other side thereof with passenger compartments at the first and third levels.

FIG. 3 is an enlarged transverse sectional view taken as indicated by line 3—3 on FIG. 1.

FIG. 4 is an enlarged fragmentary typical view taken as indicated by line 4—4 on FIG. 3.

FIG. 5 is a longitudinal top plan view of the bus situated between the docking platforms of the present invention.

FIG. 6 is a partial side elevation of the bus as it is conditioned for loading and unloading passengers, being a view taken as indicated by line 6—6 on FIG. 5.

And FIG. 7 is a transverse view of the bus between the loading and unloading platforms, showing the passenger compartment levels, being taken as indicated by line 7—7 on FIG. 6.

PREFERRED EMBODIMENT

Referring now to the drawings, the bus is comprised generally of a passenger body B, a tractor and cab unit C, and a service unit S. The chassis is shown as a unit-body construction having a skin stressed platform 10 of box cross section which establishes a lowermost floor that cantelevers fore and aft to carry the tractor and cab unit C and the service unit S. The cab unit C is supported by a forward extension of the platform 10 to carry a prime mover P and transaxle T positioned beneath the front portion of the passenger body B. The driver station 15 with controls and steering overlies the prime mover P while the transmission and front steering wheels W1 are housed within a lowermost and foremost compartment area of the body. The service unit S is supported by a rearward extension of the platform 10 to carry an air conditioning means A comprised of a compressor 16, and evaporator 17, a condenser 18, an air curculating fan 19 and a distribution manifold 20. The rear wheels W2 are housed within a rear and lowermost compartment area of the body. It is to be understood that the suspension system, brakes, fuel system, and other usual vehicle devices and mechanisms and accessories, not shown, are to be included as required in conventional state of the art form.

The passenger body B is characteristically a cellular structure comprised of a multiplicity of compartments X superimposed one above the other and extending transversely of the body, and also baggage compartments Y and Z. Each compartment X is proportioned to accommodate one and preferably two persons in either a seated or a reclining position or posture. Accordingly, the body B is divided into separate bays established by station frames 21 carried by the platform 10 and disposed in parallel transverse vertical planes. As shown, each station frame 21 is comprised of upright side columns 22 and a top beam 22', to which a coextensive bulkhead 24 is attached and between which bulkheads the bays are established. The bulkheads are essentially airtight, except for air ducting and service means extending therethrough as will be described. A roof 25 is applied to the beams 22' to cover the bays from side to side, the sides being covered by panels 26 as shown, and by access doors as will be described.

As thus far described, the bus body B is a side opening structure comprised of the lower platform 10 upon which the frames 21 are erected and to which the bulkheads 24 and roof 25 are attached, and characterized by separated bays established between said bulkheads. In accordance with this invention, each bay is divided into a multiplicity of isolated passenger compartments X, and for example four like compartments as shown. The compartment configuration in each instance is for accommodating a person either seated or reclined, and to this end has a head end portion a with sufficient headroom for a seated person and a continuing foot end portion b with reduced headroom for the legs and torso of a reclined person (see FIG. 3). The combined transverse dimension of said two portions a and b is substantially more than the stature of any person to be accommodated therein. The end portion b is closed while the end portion a is to be opened for access through the door D in which there is a window W for light, and air if so desired.

In accordance with this invention, the compartments X are stepped one over the other and side to side of the bus body B. That is, the opening end a of the lowermost compartment X is disposed toone side of the body B, while the opening end a of the next overlying compartment X is disposed to the other side of the body B, and so on left to right as shown in a four high multiplicity thereof. Since each compartment X is shorter transversely than the width of the bus body B, and is of "L" shaped cross sectional configuration as shown, the upstanding end portion a of one compartment occupies the space left unoccupied by the next higher overlying compartment. In this way the compartments nest together in stepped side to side relationship, opening alternately at opposite sides of the bus body.

The multiplicity of compartments X is established between spaced bulkheads 24 by means of vertically spaced alternately stepped horizontal disposed floors 11, 12 and 13, each extending the full length a and b of a compartment X of which it forms the total floor area. There is also a floor 14 of partial length to complete the uppermost compartment X and to establish a baggage compartment Y. The floors 11 to 14 are of imperforate hardboard, or like sheet material, adapted to span between bulkheads without undue deflection, and for the support of a coextensive mattress or padding 23, preferably in two like sections placed side by side and one for each person occupying the compartment. In practice, the pads or padding 23 are approximately 3 inches in thickness and made of foamed plastic with a cover. The platform 10 forms the floor of the lowermost compartment X, while the roof 25 forms the ceiling of the uppermost compartment X. As clearly shown, the stepped floors 11 and 12 form the ceilings of portions b and a of the first level compartment X, the stepped floors 12 and 13 form the ceiling of portions b and a of the second level compartment X, the stepped floors 13 and 14 form the ceilings of portions b and a of the third level compartment X, and the floor 14 and roof 25 from the ceilings of portions b and a of the fourth level compartment X. When a compartment X is to be divided, a separator means or panel 30 of hardboard or the like is dropped between the two cushions of padding 23 along the median line of the compartment and supported thereby as shown, with a sliding curtain 30' extending to the ceilings of the compartment where it is removeably attached (see FIG. 4).

The vertical rise in each compartment X is established by a partition 27 extending verticallybetween floors of intermediate compartments X, and between the platform 10 to floor 11 of the first level compartment X, and between the floor 13 and roof 25 of the fourth level compartment X. In practice, the uppermost and lowermost partitions 27 are of hardboard, or like sheet material, and the spaces closed off thereby establish the baggage compartment Y and a baggage compartment Z. However, the partitions 27 of the intermediate compartments X are preferably of flexible impervious fabric or the like, in order to be yeildable while separating the compartments.

The multiplicity of compartments X, Y and Z are each closed by a door D, preferably doors of the folding type as shown. The column 22 of each station frame 21 forms a door jamb, the platform 10 and floors 11–14 and roof rail 25' form the door sills and headers, thereby establishing openings to receive the doors D. The doors D are preferably sliding doors carried by slide means at the sills and headers of the compartment openings. In practice, the compartment openings are divided at their vertical centers into two like areas, and one of which is permanently closed by a fixed door panel. The sliding doors D operate to close the otherwise open area, operating between the center edges of the fixed panels and the opposite jamb column 22, where it is secured by a latch means. Accordingly, each compartment X, Y and Z is individually accessible, and individually lighted.

Referring now to the air conditioning means A and to its integration into the structure of the bus body B, there is a plurality of air induction stringers 31 and a plurality of air exhaust stringers 32 incorporated into the body. The stringers 31 and 32 are tubular structure members that extend longitudinally from the service unit S and through the bulkheads 24, with vents 31' into and vents 32' from each compartment X. In practice, the induction stringers 31 are disposed beneath each floor 12–14 and roof 25 and adjacent to the partition 27, so that the discharge from vents 31' is overhead in each compartment X and toward the faces of the passengers when seated or reclining. And, the exhaust stringers 32 are disposed at the foot end of each compartment, at platform 10 and floors 11–13, so that the exhaust through vents 32' is at a lower level and exposed to the closed foot of portion b of each compartment X. As shown, the air conditioning means in the service unit S delivers conditioned air from manifold 20 and into the induction stringers 31 for individual distribution into the multiplicity of compartment X. Air exhaust through stringers 32 is inherent with discharge through and from the unit S.

Referring now to passenger ingress and egress and to the station facility for loading and unloading of passengers, this invention provides a low level docking platform LP at one side of a guideway G and a high level docking platform HP at the other side of said guideway. The guideway G is a straight and level drive alley for positioning the bus equidistant from and parallel to the platforms LP and HP. In practice, the guideway G is marked out by drive lines 33 for alignment of the bus wheels W1 and W2, by the driver. Further, the wheel engaging support surface of the guideway G is recessed as defined by shoulders, preferably inclined laterally, or curbs 34 immediate to the drive lines 33, to accurately position the bus after being generally positioned by the driver.

The docking platforms are essentially alike, the platform LP being at a height to service the third level compartment floors 12 and the platform HP being at a height to service the fourth level compartment floors 13. As shown, the first level compartment floors, platform 10, are serviced from the drive surface, while the second level compartment floors 11 can be serviced from a step 35. The platforms LP and HP are laterally spaced from the bus body B so as to have clearance from the bus body, the space between the platforms and bus body B being spanned by extensible and retractile bridges 36 aligned with each compartment X to be serviced. In practice, there are several bridges 36 at each side platform, that are aligned with respective compartments and positoned with respect thereto by means of the bus driver moving the bus into designated marked positions 37 along the guideway G. The extensible bridges 36 can be automated or manually positioned as required, there being suitable ladders or steps to the platforms, and railings provided as indicated.

From the foregoing it will be seen that an improved high density passenger transport system is provided with terminal facilities for efficient passenger handling. The cellular and compartmented bus structure is sound, with passenger isolation as circumstances require. Passenger posture is selective for sitting or reclining, with cushioned support. And air conditioning is individually supplied to each compartment, with exhaust directed away from other cmpartments. Station facilities operating in combination with the bus and its multiplicity of compartments, provides for ease of access to compartments at various levels, and so that passengers in one compartment do not disturb or interfere with others.

Having described only the typical preferred forms and applications of my invention, I do not wish to be limited or restricted to the specific details herein set forth, but wish to reserve to myself any modifications or variations that may appear to those skilled in the art as set forth with the limits of the following claims.

I claim:

1. A bus construction for seatbed transport of passengers, and including:
   a passenger body comprised of a first level platform and longitudinally spaced transversely disposed vertical bulkheads extending the full width of and dividing the body into separate bays,
   each bay being formed by the spaced bulkheads and divided into at least two individual passenger compartments disposed one above the other, one compartment having a head portion opening at one side of the body for access and of headroom for a seated passenger and having a continuing foot end portion of reduced height for the passenger when reclining, another compartment having a head end portion opening at the other side of the body for access and of headroom for a seated passenger and having a continuing foot end portion of reduced height for the passenger when reclining, there being a longitudinally disposed floor extending between the spaced bulkheads and separating the compartments one from the other, and access doors closing the compartment openings at opposite sides of the body.

2. The bus construction as set forth in claim 1, wherein the head and foot end portions of each compartment combine to accommodate the full stature of a passenger lying therein transversely of the bus body and with a coextensive matteess therein for support of a passenger seated in the head portion or lying in the continuing head and foot portions.

3. The bus construction as set forth in claim 1, wherein a partition extends upwardly at the extremity of the foot portion of each compartment and between the spaced bulkheads and to the ceiling of the compartment formed by a said floor, thereby isolating one compartment from the other.

4. The bus construction as set forth in claim 1, wherein a partition of flexible material extends upwardly at the extremity of the foot end portion of each compartment and between the spaced bulkheads and to the ceiling of the compartment formed by a said floor, thereby isolating one compartment from the other.

5. The bus construction as set forth in claim 1, wherein each compartment has a pair of coextensive mattresses abutted along a median line of the compartmemt for support of at least two passengers, there being a separator panel inserted between the mattresses and with a curtain extending to the ceilings of the compartment.

6. A bus construction for seatbed transport of passengers, and including:
  a passenger body comprised of a first level platform and longitudinally spaced transversely disposed vertical bulkheads extending the full width of and dividing the body into separate bays,
  each bay being divided into four individual passenger compartments and one disposed above the other in successive higher levels,
  one compartment having a head portion opening at one side of the body for access and of headroom for a seated passenger and having a continuing foot end portion of reduced height for hte passenger when reclining,
  the next succeeding higher compartment having a head end portion opening at hte side of the body opposite the underlying compartment opening for access and of headroom for a seated passenger and having a continuous foot end portion of reduced height for the passenger when reclining,
  there being longitudinally disposed floors extending between the spaced bulkheads and separating first, second, third and fourth level compartments one from hte other,
  and access doors closing the compartment openings at opposite sides of the body.

7. The bus construction as set forth in claim 6, wherein the head and foot end portions of each compartment combine to accommodate the full stature of a passenger lying therein transversely of the bus body and with a coextensive mattress therein for support of a passenger seated in the head portion or lying in the continuing head and foot portions.

8. The bus construction as set forth in claim 6, wherein a partition extends upwardly at the extremity of the foot portion of each compartment and between the spaced bulkheads and to the ceiling of the compartment formed by a said floor of the succeeding higher level, thereby isolating one compartment from the other.

9. The bus construction as set forth in claim 6, wherein a partition o flexible material extends upwardly at the extremity of the foot end portion of each compartment and between the spaced bulkheads and to the ceiling of the compartment formed by a said floor of the next succeeding higher level, thereby isolating one compartment from the other.

10. The bus construction as set forth in claim 6, wherein each compartment has a pair of coextensive mattresses abutted along a median line thereof for support of at least two passengers, there being a separator panel inserted between the mattresses and with a curtain extending to the ceilings formed by the spaced floors of the succeeding higher level.

11. The bus construction as set forth in claim 1, wherein a service unit disposed at one end of the passenger body has an air conditioning means with air induction ducts extending to each compartment and with air exhaust ducts extending from each compartment.

12. The bus construction as set forth in claim 6, wherein a service unit disposed at one end of the passenger body has an air conditioning means with air induction stringer-ducts extending through the bulkheads and having control vents opening into each compartment and with an exhaust stringer-duct extending through the bulkheads and having vents opening from each compartment.

13. The bus construction as set forth in claim 1, wherein a service unit disposed at one end of the passenger body has an air conditioning means with air induction ducts extending to each compartment and discharging into the head end portion thereof and with air exhaust ducts extending from each compartment and exhausting from the foot end portion thereof.

14. The bus construction as set forth in claim 6, wherein a service unit disposed at one end of the passenger body has an air conditioning means with air induction stringer-ducts extending through the bulkheads and having control vents opening into the head end portion of each compartment and with an exhaust stringer-duct extending through the bulkheads and having vents opening from the foot end portion of each compartment.

15. In combination with the bus construction as set forth in claim 1, a passenger station comprised of a horizontal platform disposed along said one side of the passenger body, and a horizontal platform disposed along said other side of the passenger body, for ingress and egress of passengers to said compartments.

16. In combination with the bus construction as set forth in claim 1, a passenger station comprised of a horizontal platform disposed along said one side of the passenger body, a horizontal platform disposed along said other side of the passenger body, and extensible and retractable bridges extending from the platform and to the access openings of the compartments for ingress and egress of passengers to said compartments.

17. In combination with the bus construction as set forth in claim 1, a recessed guideway defined by side shoulders to position the bus driven into a passenger loading station, a horizontal platform disposed parallel to the guideway and along said one side of the passenger body, and a horizontal platform disposed parallel to the guideway and along said other side of the passenger body, for ingress and egress of passengers to said compartments.

18. In combination with the bus construction as set forth in claim 1, a recessed guideway defined by side shoulders to position the bus driven into a passenger loading station, a horizontal platform disposed parallel to the guideway and along said one side of the passenger body, a horizontal platform disposed parallel to the guideway and along said other side of the passenger body, and extensible and retractable bridges extending from the platform and to the access openings of the compartments for ingress and egress of passengers to said compartments.

19. In combination with the bus construction as set forth in claim 6, a passenger loading station comprised of a guideway to position the bus driven into a loading position, the first level compartment ingress and egress being from the level of the guideway at one side of the bus, the second level compartment ingress and egress being from a step disposed at the level of and parallel to the guideway and along said other side of the bus, the third level compartment ingress and egress being from a platform disposed at the level of and parallel to the guideway and along said one side of the bus, and the fourth level compartment ingress and egress being from a platform disposed at the level of and parallel to the guideway and along said other side of the bus.

20. The combination as set forth in claim 19, wherein extensible and retractable bridges extend from the step and from the platforms and to the access opening of the compartments.

* * * * *